United States Patent
Lee

(10) Patent No.: US 9,902,367 B2
(45) Date of Patent: Feb. 27, 2018

(54) VEHICLE AND METHOD FOR CONTROLLING THE VEHICLE

(71) Applicant: HYUNDAI MOTOR COMPANY, Seoul (KR)

(72) Inventor: SeokHan Lee, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/265,019

(22) Filed: Sep. 14, 2016

(65) Prior Publication Data

US 2017/0151929 A1 Jun. 1, 2017

(30) Foreign Application Priority Data

Dec. 1, 2015 (KR) .................. 10-2015-0169818

(51) Int. Cl.
*G05B 19/00* (2006.01)
*B60R 25/20* (2013.01)
*B60R 25/022* (2013.01)
*H04L 29/08* (2006.01)

(52) U.S. Cl.
CPC ........ *B60R 25/2018* (2013.01); *B60R 25/022* (2013.01); *B60R 25/209* (2013.01); *B60R 2325/10* (2013.01); *H04L 67/12* (2013.01)

(58) Field of Classification Search
CPC ...... G07C 2009/00246; G07C 2209/08; G07C 2209/63; G07C 5/02; G07C 5/08; G07C 9/00023; G07C 9/00111; G07C 9/00309
USPC ................ 307/10.2, 10.7; 340/10.33, 10.34, 340/426.36, 5.6, 5.61, 5.63, 5.64, 5.72
See application file for complete search history.

(56) References Cited

U.S. PATENT DOCUMENTS

| 6,240,362 | B1* | 5/2001 | Gaspard, II | G01C 21/343 340/991 |
| 8,798,205 | B2* | 8/2014 | Ecker | H04W 52/0229 375/271 |
| 2005/0020249 | A1* | 1/2005 | Seo | H04M 1/663 455/414.1 |
| 2011/0086660 | A1* | 4/2011 | Sun | H04W 56/00 455/509 |
| 2014/0300448 | A1* | 10/2014 | Ochiai | B60R 25/24 340/5.72 |

FOREIGN PATENT DOCUMENTS

| JP | 2002-081239 A | 3/2002 |
| JP | 2011-179263 A | 9/2011 |
| JP | 2011-230685 A | 11/2011 |

(Continued)

OTHER PUBLICATIONS

Ikeo et al., Control System (EP Machine Translation), Feb. 23, 2012, Espacenet, JP2012036669 (A).*

(Continued)

*Primary Examiner* — Carlos E Garcia
(74) *Attorney, Agent, or Firm* — McDermott Will & Emery LLP

(57) ABSTRACT

A vehicle including a user command reception unit for receiving a user command, a pattern decision unit for determining a vehicle use pattern on the basis of a reception time of the user command, and a low frequency (LF) transmission unit for transmitting a search signal of a smart key on the basis of the vehicle use pattern.

19 Claims, 8 Drawing Sheets

(56) References Cited

FOREIGN PATENT DOCUMENTS

| JP | 2012-036669 A | 2/2012 |
| JP | 2014-035647 A | 2/2014 |
| JP | 2015-003545 A | 1/2015 |
| KR | 10-2010-0012638 A | 2/2010 |
| KR | 10-2014-0090728 A | 7/2014 |

OTHER PUBLICATIONS

Korean Notice of Allowance dated Feb. 23, 2017, issued in Korean Patent Application No. 10-2015-0169818. (w/ English translation).

\* cited by examiner

VEHICLE AND METHOD FOR CONTROLLING THE VEHICLE

CROSS-REFERENCE TO RELATED APPLICATION

This application claims the benefit of priority to Korean Patent Application No. 10-2015-0169818, filed on Dec. 1, 2015 with the Korean Intellectual Property Office, the disclosure of which is incorporated herein by reference.

TECHNICAL FIELD

Embodiments of the present disclosure relate to a vehicle configured to transmit a search signal and a method for controlling the vehicle.

BACKGROUND

A smart key system allows a driver who is located outside a vehicle to open or close doors of the vehicle as well as to start the vehicle, although the driver does not insert an ignition key into a key box of the vehicle and does not perform a special manipulation for vehicle operation. Generally, a smart card capable of being easily carried by the driver and a smart key fob for wireless communication have been used for the smart key system.

If the driver who carries the smart key approaches the vehicle, a door lock is automatically released through Low Frequency (LF) and Radio Frequency (RF) communication with the smart key, such that the driver can easily open the doors without inserting a key into a keyhole of the door and can start the vehicle without insertion of the ignition key.

In more detail, the smart key system for use in vehicles includes a process of transmitting a search signal (LF frequency band) to search for the smart key located in the vicinity of the vehicle, and a process of receiving a search response signal (RF frequency band) from the smart key in response to the search signal.

The LF signal, having a relatively lower frequency band than the RF signal, has a limited transmission distance, such that the vehicle can receive the search response signal from the smart key only when the smart key is located close to the vehicle.

Therefore, in order to determine whether the smart key is located in the vicinity of the vehicle, the vehicle periodically transmits the search signal over the LF communication network. If the vehicle receives the search response signal from the smart key at a specific time, the vehicle communicates with the smart key.

On the other hand, the vehicle according to the conventional art periodically transmits the search signal to a peripheral region during a predetermined time during which the user does not use the vehicle, resulting in unnecessary power consumption of the vehicle.

SUMMARY

Therefore, it is an aspect of the present disclosure to provide a vehicle configured to variably transmit a search signal to a peripheral region by discriminating between a first time zone in which a user uses the vehicle and a second time zone in which the user does not use the vehicle, and a method for controlling the vehicle.

Additional aspects of the disclosure will be set forth in part in the description which follows and, in part, will be obvious from the description, or may be learned by practice of the disclosure.

In accordance with an aspect of the present disclosure, a vehicle includes: a user command reception unit to receive a user command; a pattern decision unit to determine a vehicle use pattern on the basis of a reception time of the user command; and a low frequency (LF) transmission unit to transmit a search signal of a smart key on the basis of the vehicle use pattern.

The pattern decision unit may generate a front-rear time range of the user command reception time as a vehicle use time zone.

The LF transmission unit may transmit the search signal at intervals of a first cycle during the vehicle use time zone of a first time period, and transmit the search signal at intervals of a second cycle during the remaining time zones other than the vehicle use time zone during the first time period.

The front-rear time range may include a time zone ranging from a first time point located before a predetermined reference time on the basis of the user command reception time to a second time point located after the predetermined reference time on the basis of the user command reception time.

The first time period may include 24 hours.

The first cycle may be shorter than the second cycle.

The vehicle use pattern may include a plurality of vehicle use time zones.

The pattern decision unit may update the vehicle use pattern at intervals of the first time period.

The vehicle use time zone may be a new vehicle use time zone. The pattern decision unit may generate a final vehicle use time zone by combining the new vehicle use time zone with a conventional vehicle use time zone. The LF transmission unit may transmit the search signal at intervals of the first cycle during the final vehicle use time zone of the first time period, and may transmit the search signal at intervals of the second cycle during the remaining time zones other than the final vehicle use time zone of the first time period.

The pattern decision unit may compare a start time of the new vehicle use time zone with a start time of the conventional vehicle use time zone, may compare an end time of the new vehicle use time zone with an end time of the conventional vehicle use time zone, and may update the vehicle use pattern according to the result of comparison.

The pattern decision unit may initialize the vehicle use pattern at intervals of the second cycle.

In accordance with another aspect of the present disclosure, a method for controlling a vehicle includes: receiving a user command; determining a vehicle use pattern on the basis of a reception time of the user command; and transmitting a search signal of a smart key on the basis of the vehicle use pattern.

The determining the vehicle use pattern may include: generating a front-rear time range of the user command reception time as a vehicle use time zone.

The transmitting the search signal of the smart key may include: transmitting the search signal at intervals of a first cycle during the vehicle use time zone of a first time period; and transmitting the search signal at intervals of a second cycle during the remaining time zones other than the vehicle use time zone during the first time period.

The front-rear time range may include a time zone ranging from a first time point located before a predetermined reference time on the basis of the user command reception time to a second time point located after the predetermined reference time on the basis of the user command reception time.

The determining the vehicle use pattern may further include: updating the vehicle use pattern at intervals of the first time period.

The vehicle use time zone may be a new vehicle use time zone; the generating the front-rear time range may include generating a final vehicle use time zone by combining the new vehicle use time zone with a conventional vehicle use time zone. The transmitting the search signal may include transmitting the search signal at intervals of the first cycle during the final vehicle use time zone of the first time period; and transmitting the search signal at intervals of the second cycle during the remaining time zones other than the final vehicle use time zone of the first time period.

The determining the vehicle use pattern may further include: initializing a vehicle use pattern at intervals of a second time period.

The method may further include: before the reception of the user command, authenticating the smart key.

The transmitting the search signal may include: transmitting the search signal through a low frequency (LF) communication network.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
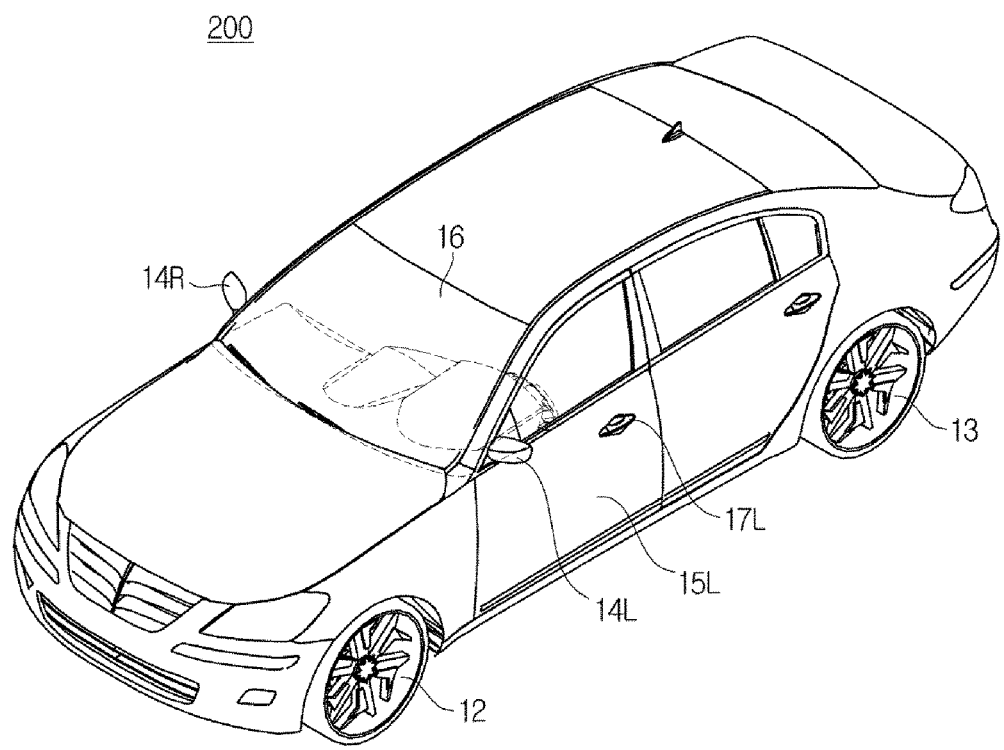
FIG. 1 is a perspective view illustrating an appearance of a vehicle according to an embodiment of the present disclosure.

Reference will now be made in detail to the embodiments of the present disclosure, examples of which are illustrated in the accompanying drawings, wherein like reference numerals refer to like elements throughout. Hereinafter, the above and other objects, specific advantages, and novel features of the present disclosure will become apparent from the following description of embodiments, given in conjunction with the accompanying drawings. Reference will now be made in detail to the embodiments of the present disclosure, examples of which are illustrated in the accompanying drawings. Wherever possible, the same reference numbers will be used throughout the drawings to refer to the same or like parts. In the following description, known functions or structures, which may confuse the substance of the present disclosure, are not explained. It will be understood that, although the terms first, second, etc. may be used herein to describe various elements, components, regions, and/or sections, these elements, components, regions, layers and/or sections should not be limited by these terms.

Figure 2:
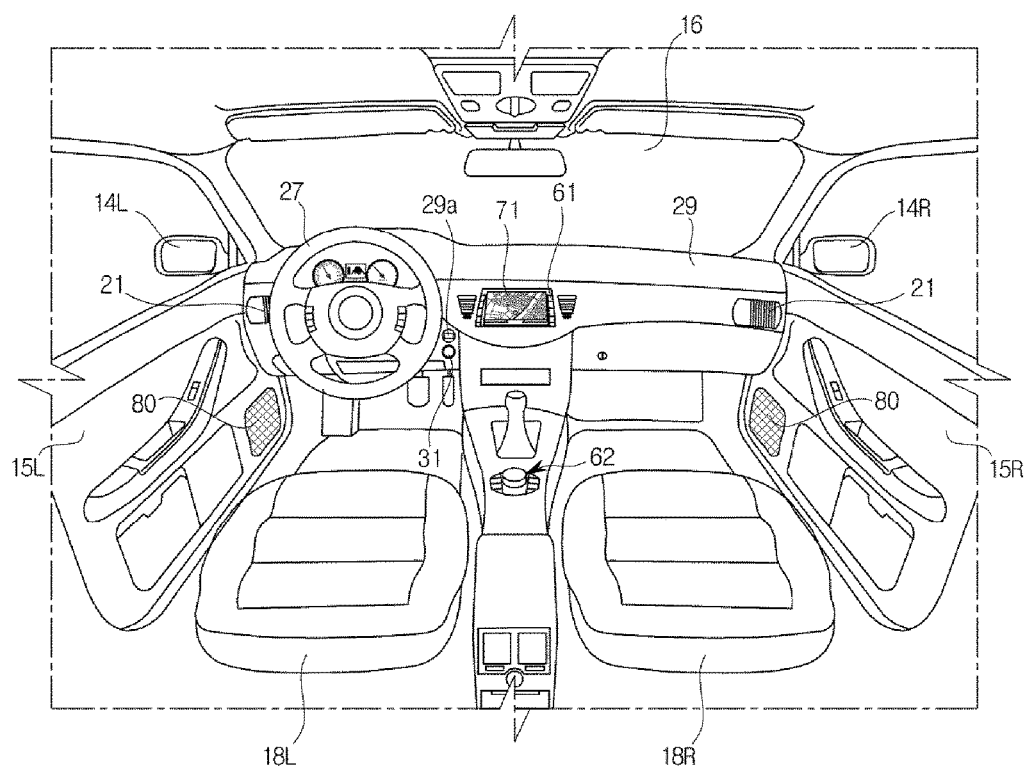
FIG. 2 is a view illustrating an internal structure of the vehicle according to an embodiment of the present disclosure.

FIG. 1 is a perspective view illustrating an appearance of a vehicle according to an embodiment of the present disclosure. FIG. 2 is a view illustrating an internal structure of the vehicle according to an embodiment of the present disclosure.

Referring to FIG. 1, the appearance of the vehicle 200 according to the embodiment includes vehicle wheels (12, 13) to move the vehicle 200 from place to place, doors 15L to shield an indoor space of the vehicle 200 from the outside, a vehicle windshield 16 to provide a forward view of the vehicle 200 to a vehicle driver who rides in the vehicle 200, and side-view mirrors (14L, 14R) to provide a backward view of the vehicle 200 to the vehicle driver.

The wheels (12, 13) may include front wheels 12 provided at the front of the vehicle and rear wheels 13 provided at the rear of the vehicle. The drive unit (not shown) installed in the vehicle 200 may provide rotational force to the front wheels 12 or the rear wheels 13 in a manner that the vehicle 200 moves forward or backward. The drive unit (not shown) may include an engine to generate rotational force by burning fossil fuels or a motor to generate rotational force upon receiving a power source from a condenser or battery.

The doors (15L, 15R) shown in FIG. 2 are rotatably provided at the right and left sides of the vehicle 200 so that a vehicle driver can ride in the vehicle 200 when any of the doors (15L, 15R) is open and an indoor space of the vehicle 200 can be shielded from the outside when the doors (15L, 15R) are closed. In addition, a knob 17L to open or close the doors (15L, 15R) may be provided at the outside of the vehicle 200, and a Low Frequency (LF) antenna (not shown) to transmit the LF signal may be mounted to the knob 17L.

If authentication between the smart key 100 and the vehicle 200 is completed over the wireless communication network, door lock of the vehicle 200 is released, and the door 15L may be opened by the user who pulls the knob 17L.

The windshield 16 is provided at a front upper portion of the vehicle 200 so that a vehicle driver who rides in the vehicle 200 can obtain visual information in a forward direction of the vehicle 200. The windshield 16 may also be referred to as windshield glass.

The side-view mirrors (14L, 14R) may include a left side-view mirror 14L provided at the left of the vehicle 200 and a right side-view mirror 14R provided at the right of the vehicle 200, so that the driver who rides in the vehicle 200 can obtain visual information of the lateral and rear directions of the vehicle 200.

The vehicle 200 may also include a variety of sensing devices, for example, a proximity sensor to detect the presence of obstacles located at the lateral and rear directions of the vehicle 200, a rain sensor to detect the presence or absence of rainfall and the amount of rainfall, etc.

For example, the proximity sensor emits a sensing signal to a lateral direction or a backward direction of the vehicle, and receives a signal reflected from obstacles such as other vehicles. In addition, the proximity sensor may detect the presence or absence of an obstacle located at the rear of the vehicle 1 on the basis of a waveform of the received reflection signal, and may recognize the position of obstacle. The proximity sensor may emit ultrasonic waves, and may detect the distance to the obstacle using the ultrasonic waves reflected from the obstacle.

Referring to FIG. 2, an Audio Video Navigation (AVN) display 71 and the AVN input unit 61 may be mounted to the center region of the dashboard 29. The AVN display 71 may selectively display at least one of an audio screen image, a video screen image and a navigation screen image. In addition, the AVN display 71 may display various control screen images related to the vehicle 200 or screen images related to additional functions.

The AVN display 61 may be implemented by any one of a Liquid Crystal Display (LCD), a Light Emitting Diode (LED), a Plasma Display Panel (PDP), an Organic Light Emitting Diode (OLED), a Cathode Ray Tube (CRT), etc.

The AVN input unit 61 formed in a hard key shape may be mounted to one region adjacent to the AVN display 71. If the AVN display 71 is implemented as a touchscreen, the AVN display may also be implemented as a touch panel at the front surface of the AVN display 71.

The center input unit 62 may be implemented as a jog-wheel located between the driver seat and the passenger seat. The user may input a control command by moving the center input unit 62 forward or backward and to the left or right or by pressing or turning the center input unit 62.

The vehicle 200 may include a sound output unit 80 to output the acoustic or sound signal. The sound output unit 80 may be implemented as a speaker. The sound output unit 80 may output the acoustic or sound signal needed to perform the audio function, the video function, the navigation function and other additional functions.

For example, the sound output unit 233 may be respectively mounted to the left door 15L and the right door 15R. If necessary, the sound output unit 233 may also be mounted to other regions, for example, doors of the rear seat, the dashboard 29, etc.

The steering wheel 27 may be mounted to the dashboard 29 located adjacent to the driver seat 18L, and a keyhole 31 in which the smart key (e.g., a key fob) can be inserted may be disposed close to the steering wheel 27. If the smart key is inserted into the keyhole 31, the smart key can communicate with the vehicle 200.

In addition, the dashboard 29 may include a start button 31 to turn the vehicle 200 on or off. The smart key may be inserted into the keyhole 29a. If authentication between the smart key 100 and the vehicle 100 is completed over the wireless communication network, the vehicle 200 starts operation by the user who pushes the start button 31.

In the meantime, the vehicle 100 may include an air-conditioner configured to perform a heating and cooling function, and may control air temperature of the internal space of the vehicle 200 by discharging the heated or cooled air through the air outlet 21.

Figure 3:
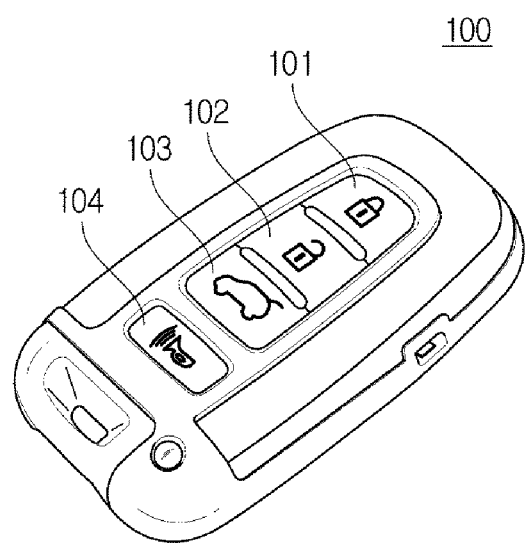
FIG. 3 is a view illustrating an example of a smart key.
Figure 4:
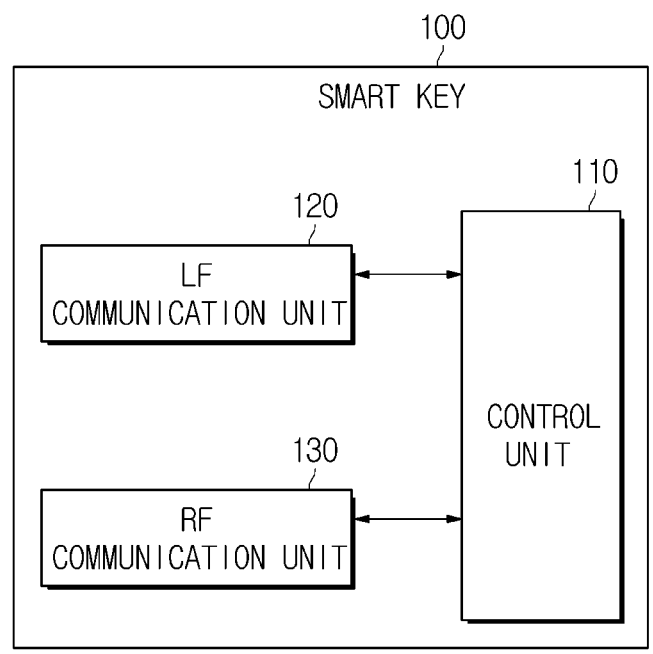
FIG. 4 is a block diagram illustrating the smart key according to an embodiment of the present disclosure.

FIG. 3 is a view illustrating an example of a smart key. FIG. 4 is a block diagram illustrating a smart key according to an embodiment of the present disclosure.

Referring to FIG. 3, the smart key 100 may be connected to the vehicle 200 through wired or wireless communication.

For example, the smart key 100 may be implemented as a key fob, which is connected to the vehicle 200 through wired or wireless communication such that the door lock can be released and the vehicle can start operation and travel.

Referring to FIG. 3, the smart key 100 may include a hard key 101 to lock all doors of the vehicle 200, a hard key 102 to release door lock, a hard key 103 to release truck lock, and a hard key 104 to allow the vehicle 200 to honk a horn. However, the scope or spirit of the smart key 100 is not limited thereto, and other hard keys or buttons configured to perform various functions may also be provided as necessary.

The smart key 100 shown in FIG. 3 may include not only the key fob but also all kinds of devices capable of releasing the door lock or controlling the vehicle 200 in a manner that the vehicle can start operation or can start traveling. For example, assuming that the mobile device serves as the smart key, the smart key 100 may also include at least one mobile device therein. In this case, an application capable of performing the operations of the smart key 100 may be installed at the mobile device. The application may be installed in the mobile device during the manufacturing process and then introduced onto the market. After the mobile device including the application has been sold to consumers, the mobile device may download the application from the server according to a user request. In addition, the authentication procedure may be needed in a manner that the mobile device can operate as the smart key 100 of the vehicle 200.

The smart key 100 may be simultaneously sold to consumers along with the vehicle 200, and authentication information needed to connect to the vehicle 200 may be pre-stored in the vehicle 200 and/or the smart key 100.

Referring to FIG. 4, the smart key 100 according to one embodiment may include a control unit 110 to control constituent elements of the smart key, a Low Frequency (LF) communication unit 120 to receive the LF signal and a Radio Frequency (RF) communication unit 130 to transmit the RF signal.

The control unit 110 of the smart key 100 may include a memory to store programs and data needed to modulate/demodulate the LF or RF signal; and a processor to modulate/demodulate the LF or RF signal according to the programs and data stored in the memory.

The LF communication unit 120 may receive the LF signal from various electronic devices located outside the smart key 100 through the LF communication network. For example, the LF signal may be a radio signal having a low frequency band of 120 kHz to 135 kHz.

The LF communication unit 120 according to one embodiment may receive the search signal from the vehicle 200.

The search signal may be used as an LF signal, which is transmitted from the vehicle 200 in a peripheral region (within the distance within which LF communication is available) of the vehicle 200 so as to determine whether the smart key 100 is located in the LF communication range.

The LF communication unit 120 may include an LF communication interface, which includes a communication port configured to interconnect the LF communication network and the control unit 110 of the smart key 100, and a receiver configured to receive the LF signal.

In addition, the LF communication unit 120 may further include an LF signal conversion module, which demodulates the LF signal received through the LF communication interface into a control signal upon receiving a control signal of the control unit 110 of the smart key 100.

The RF communication unit 130 may transmit the RF signal to various electronic devices located outside the smart key 100 through the RF communication network. For example, the RF signal may be a radio signal having an Ultra-High Frequency (UHF) band of 315 MHz to 433 MHz.

The RF communication unit 130 according to one embodiment may transmit the search response signal to the vehicle 200 in response to the search signal.

The search response signal may be used as the RF signal transmitted from the smart key 100 to the vehicle 200 in such a manner that the vehicle 200 can recognize that the smart key 100 has received the search signal from the vehicle 200.

The RF communication unit 130 may include a Radio Frequency (RF) communication interface, which includes a communication port to interconnect the RF communication network and the control unit 110 of the smart key 100, and a transmitter to transmit the RF signal.

In addition, the RF communication unit 130 may modulate digital control signals generated from the control unit 110 of the smart key 100 into analog communication signals to be transmitted through the RF communication interface.

As described above, the LF signal may be a signal received by the smart key 100 through the LF communication network, the RF signal may be a signal transmitted from the smart key 100 through the RF communication network, and the control signal of the smart key 100 may be a transmission/reception (Tx/Rx) signal in the smart key 100. The control signal, the RF signal, and the LF signal may have different formats.

Figure 5:
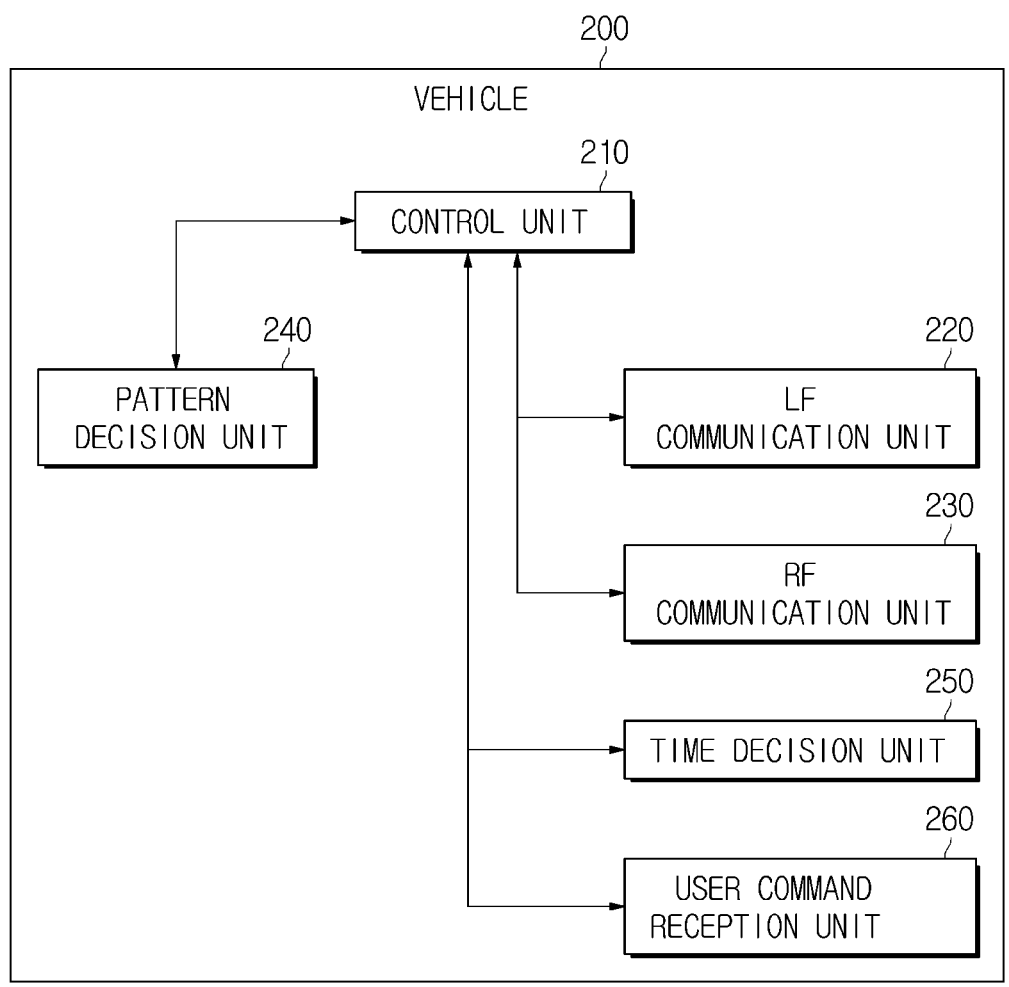
FIG. 5 is a block diagram illustrating a vehicle according to an embodiment of the present disclosure.

FIG. 5 is a block diagram illustrating a vehicle according to an embodiment of the present disclosure.

Referring to FIG. 5, the vehicle 200 may include a control unit 210 to control various electronic components or constituent elements embedded in the vehicle 200, an LF communication unit 220 to transmit the LF signal and an RF communication unit 230 to receive the RF signal.

The control unit 210 may control various electronic components or constituent elements embedded in the vehicle 200. For example, the control unit 210 may control the LF communication unit 220 to transmit the search signal.

The control unit 210 according to one embodiment may change a transmission period of the search signal according to a vehicle use pattern of the user. The vehicle use pattern of the user may be generated by a pattern decision unit 240 to be described later.

The control unit 210 may include a steering lock control unit to control locking/release of the steering wheel 27, a start button control unit to control locking/release of the start button 31 configured to turn the vehicle 200 on or off, and a trunk control unit to control locking/release of the trunk (not shown) of the vehicle 200. The control unit 210 may further include various control modules configured to control locking/release of electronic components embedded in the vehicle 200 according to the presence or absence of authentication related to the smart key.

The control unit 210 may include a memory to store programs and data configured to control electronic components embedded in the vehicle 200, and a processor to generate a control signal according to programs and data stored in the memory.

The LF communication unit 220 may transmit the LF signal to various electronic devices located outside the vehicle 200 through the LF communication network. For example, the LF signal may be a radio signal having a low frequency band of 120 kHz to 135 kHz.

The LF communication unit 220 according to one embodiment may transmit the search signal to the smart key 100 according to a transmission period of the search signal.

The search signal may denote the LF signal, which is transmitted from the LF communication unit 220 to a peripheral region (within the distance within LF communication is available) so as to determine whether the smart key 100 is within the LF communication range of the vehicle 200.

The LF communication unit 220 may include an LF communication interface, which includes a communication port configured to interconnect the LF communication network and the control unit 210, and a transmitter configured to transmit the LF signal.

In addition, the LF communication unit 220 may modulate digital control signals generated from the control unit 210 into analog communication signals to be transmitted through the LF communication interface.

The RF communication unit 230 may transmit the RF signal to various electronic devices located outside the vehicle 200 through the RF communication network. For example, the RF signal may be a radio signal having an Ultra-High Frequency (UHF) band of 315 MHz to 433 MHz.

The RF communication unit 230 according to one embodiment may receive the search response signal from the smart key 100.

The search response signal may denote the RF signal transmitted from the smart key 100 to the vehicle 200 in such a manner that the vehicle 200 can recognize that the smart key 100 has received the search signal from the vehicle 200.

The RF communication unit 230 may include a Radio Frequency (RF) communication interface, which includes a communication port to interconnect the RF communication network and the control unit 210, and a receiver to receive the RF signal.

In addition, the RF communication unit 230 may further include an RF signal conversion module to demodulate the RF signal received through the RF communication interface into a control signal according to a control signal of the control unit 210.

As described above, the LF signal may be a signal transmitted from the vehicle 200 through the LF communication network, the RF signal may be a signal received by the vehicle 200 through the RF communication network, and the control signal of the vehicle 200 may be a transmission/reception (Tx/Rx) signal for use in the vehicle 200. The control signal, the RF signal and the LF signal may have different formats.

If the LF communication unit 220 of the vehicle 100 transmits the search signal to the smart key 100, and if the RF communication unit receives the search response signal from the smart key 100, the vehicle 200 and the smart key 100 may perform a series of authentication processes. Upon completion of such authentication, the control unit 210 may unlock various electronic components embedded in the vehicle 200 in a manner that the authenticated user can use the electronic components. For example, upon completion of such authentication, the control unit 210 may unlock the steering wheel 27, may unlock the start button 31, may unlock the trunk of the vehicle 200, and may also release door lock of the knobs 17L.

The method for performing authentication between the vehicle 200 and the smart key 100 is well known to those skilled in the art, and as such a detailed description thereof will herein be omitted for convenience of description.

The vehicle 200 according to one embodiment may further include a pattern decision unit 240 to determine a vehicle use pattern of a user, a time decision unit 250 to determine a current time and a user command reception unit 260 to receive a command from the user.

The pattern decision unit 240 may generate the vehicle use pattern of the user on the basis of a reception time of the user command received by the user command reception unit 260.

In more detail, assuming that the user command reception unit 260 receives the user command, the pattern decision unit 240 may determine the front-rear time range on the basis of the reception time of the user command, and may generate a new vehicle use pattern on the basis of the determined front-rear time range and the pre-stored vehicle use pattern.

The front-rear time range may denote a time period or time zone between a user command reception time (e.g., 6:00 PM) and a specific time (e.g., 5:30 PM) located before a predetermined reference time (e.g., 30 minutes) on the basis of the user command reception time (e.g., 6:00 PM), or may denote a time period or time zone between the user command reception time (e.g., 6:00 PM) and a specific time (e.g., 6:30 PM) located after the predetermined reference time (e.g., 30 minutes) on the basis of the user command reception time (e.g., 6:00 PM).

In this case, the pattern decision unit 240 may determine the reception time of the user command on the basis of a current time decided by the time decision unit 250.

The pattern decision unit 240 may include a memory to store not only a program for retrieving a conventional vehicle use pattern or generating a new vehicle use pattern according to a control signal of the control unit 210, but also a vehicle use pattern, and a processor to generate a control signal according to the program and data stored in the memory.

For example, the time decision unit 250 may be a timer configured to determine a current time. In this case, the current time may include information regarding at least one of a current date, time and day.

In addition, the time decision unit 250 may include a memory to store a program and data, and a processor to generate a control signal according to the program and data stored in the memory. In more detail, the program stored in the memory may allow the time decision unit 250 to receive data regarding a current date, time, day etc. from an external communication subject, and the data stored in the memory is associated with the current date, time, day etc.

In accordance with the embodiment, the control unit 210, the pattern decision unit 240, and the time decision unit 250 may be implemented as different memories and processors or may also be implemented as a single memory and processor.

The user command reception unit 260 may include various kinds of input devices (for example, a hard key, a touchscreen, a touchpad, a dial manipulation unit, etc.) configured to receive a lock or unlock command of constituent elements (for example, a door lock knob 17L, a steering wheel 207, a start button 31 or a trunk opening unit (not shown), etc.) embedded in the vehicle 200, as shown in FIGS. 1 and 2.

In addition, the user command reception unit 260 may be combined with the RF communication unit 230 configured to receive a lock or unlock command of the door lock, a command for releasing the trunk lock, etc. from the smart key 100 through the RF communication network.

If authentication between the vehicle 200 and the smart key 100 is completed, and if the user command reception unit 260 receives the lock or unlock command, the control unit 210 may control constituent elements embedded in the vehicle 200 according to a user command. For example, the control unit 210 may lock or unlock the constituent elements embedded in the vehicle 200 according to the user command, or may start operation of the vehicle 200 according to the user command. However, if authentication between the vehicle 200 and the smart key 100 is not completed, although the user command reception unit 260 receives the user command, the vehicle 200 may maintain a conventional state (e.g., non-execution of locking or unlocking).

Figure 6:
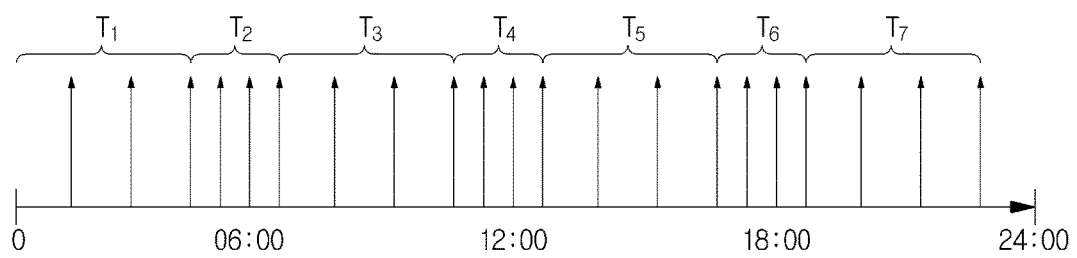
FIG. 6 illustrates an example of the search signal transmitted according to a vehicle use pattern.
Figure 7:
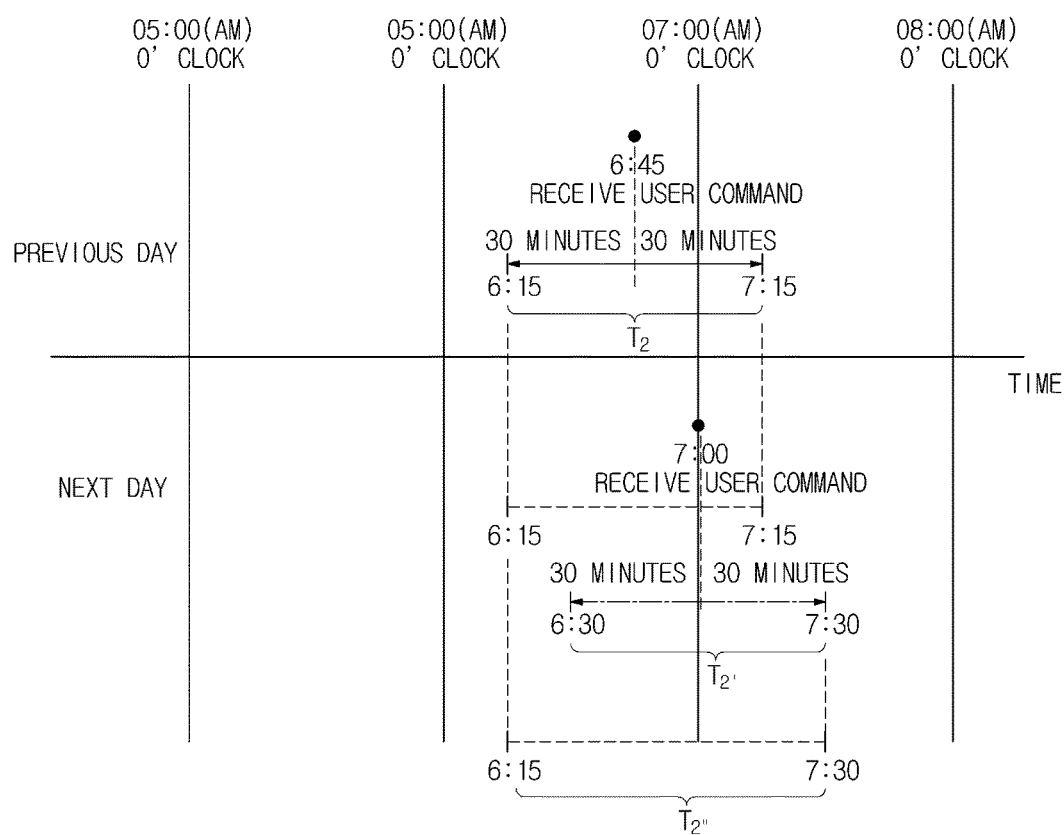
FIG. 7 illustrates an example of the vehicle use pattern changed according to a user command.

The vehicle use pattern generated by the pattern decision unit 240 and the search signal transmitted according to the vehicle use pattern will hereinafter be described with reference to FIGS. 6 and 7. FIG. 6 illustrates an example of a search signal transmitted according to a vehicle use pattern. FIG. 7 illustrates an example of a vehicle use pattern changed according to a user command.

Referring to FIG. 6, the LF communication unit 220 of the vehicle 200 may transmit the search signal according to the vehicle use pattern stored in the pattern decision unit 240.

The vehicle use pattern may include information regarding a first time zone (hereinafter referred to as a vehicle use time zone) in which the vehicle is used by the user and information regarding a second time zone (hereinafter referred to as a vehicle unused time zone) in which the vehicle is not used by the user. In FIG. 6, the vehicle use time zone may include a T2 time zone (in the vicinity of 06:00 (AM)), a T4 time zone (in the vicinity of 12:00 PM) and a T6 time zone (in the vicinity of 6:00 PM). The vehicle unused time zone may include a plurality of time zones (T1, T3, T5, T7).

During the vehicle used time zones (T2, T4, T6), the LF communication unit 220 may transmit the search signal at intervals of a first period. During the vehicle unused time zones (T1, T3, T5, T7), the LF communication unit 220 may transmit the search signal at intervals of a second period. In this case, the second period may be longer than the first period.

The LF communication unit 220 transmits the search signal at intervals of a second period longer than the first period during the vehicle unused time zone (T1, T3, T5, or T7), such that power consumption caused by transmission of the search signal in the vehicle unused time zone can be reduced.

The pattern decision unit 240 may determine a time zone located before or after a specific time at which the user command reception unit 260 receives the user command, may designate the time zone as the vehicle use time zone and may designate the remaining time zones other than the time zone as the vehicle unused time zone, resulting in formation of a vehicle use pattern.

Referring to FIG. 6, assuming that the user command reception unit 260 receives the user command at a specific time 6:00 AM, the pattern decision unit 240 may determine a time zone (T2), which ranges from a first time point (i.e., 5:45 AM) located before a predetermined reference time (e.g., 15 minutes) to a second time point (i.e., 6:15 AM) located after the reference time (e.g., 15 minutes) on the basis of the current time (i.e., 6:00 AM) decided by the time decision unit 250, to be the vehicle use time zone.

Likewise, assuming that the user command reception unit 260 receives the user command at 12:00 PM, the pattern decision unit 240 may determine a time zone (T4), which ranges from a first time point (i.e., 11:45 AM) located before a predetermined reference time (e.g., 15 minutes) to a second time point (i.e., 12:15 PM) located after the reference time (e.g., 15 minutes) on the basis of the current time (i.e., 12:00 PM) decided by the time decision unit 250, to be the vehicle use time zone.

Assuming that the user command reception unit 260 receives the user command at 6:00 PM, the pattern decision unit 240 may determine a time zone (T6), which ranges from a first time point (i.e., 5:45 PM) located before a predetermined reference time (e.g., 15 minutes) to a second time point (i.e., 6:15 PM) located after the reference time (e.g., 15 minutes) on the basis of the current time (i.e., 6:00 PM) decided by the time decision unit 250, to be the vehicle use time zone.

The pattern decision unit 240 may determine the remaining time zones (T1, T3, T5, T7) other than some time zones (T2, T4, T6) in 24 hours corresponding to a day to be the vehicle unused time zone, and may store the remaining time zones (T1, T3, T5, T7) in the memory.

Therefore, the control unit 210 may control the LF communication unit 20 to transmit the search signal to the peripheral region on the basis of the vehicle use time zone and the vehicle unused time zone stored in the memory.

In the meantime, the pattern decision unit 240 may update the vehicle use pattern in units of a first period (e.g., a day), and may initialize the vehicle use pattern in units of a second period (e.g., a week).

FIG. 7 is a conceptual diagram illustrating a process for controlling a pattern decision unit to update a vehicle use pattern at intervals of a day according to an embodiment of the present disclosure.

Referring to FIG. 7, under the condition that a vehicle use pattern is initialized, if authentication between the vehicle 200 and the smart key 100 is completed, and if the user command reception unit 260 receives the user command (e.g., a command for releasing door lock of the knob 17L), the time decision unit 250 may determine a current time (i.e., 6:45 AM), and the pattern decision unit 240 may determine a predetermined time zone, which ranges from a first time point (i.e., 6:15 AM) (including 06:15:00) located before a predetermined reference time (e.g., 30 minutes) to a second time point (i.e., 7:15 AM) (but not including 07:15:00) located after the reference time (e.g., 30 minutes) on the basis of the current time (i.e., 6:45 AM), to be the vehicle use time zone T2, and may determine the remaining time zones other than the predetermined time zone to be the vehicle unused time zone and then store the vehicle unused time zone.

After a lapse of one day, the LF communication unit 220 of the vehicle 200 may transmit the search signal according to the stored vehicle use pattern at intervals of a first period during the T2 time zone, and may transmit the search signal at intervals of a second period during the remaining time zones other than the T2 time zone from among 24 hours.

At any one time point, the RF communication unit 230 may receive the search response signal from the smart key 100. Upon completion of authentication between the vehicle 200 and the smart key 100, the user command reception unit 260 may receive the user command.

The control unit 210 may control constituent elements embedded in the vehicle 200 according to the user command.

In this case, the time decision unit 250 may determine a reception time (e.g., 7:00 AM) of the user command.

The pattern decision unit 240 may determine a predetermined time zone, which ranges from a first time point (i.e., 6:30 AM) (including 06:30:00) located before a predetermined reference time (e.g., 30 minutes) to a second time point (i.e., 7:30 AM) (but not including 07:30:00) located after the reference time (e.g., 30 minutes) on the basis of the current time (i.e., 7:00 AM), to be a new vehicle use time zone (T2').

The pattern decision unit 240 may determine the final vehicle use time zone (T2") on the basis of the conventional vehicle use time zone (T2) and the new vehicle time zone (T2').

In more detail, the pattern decision unit 240 may generate the final vehicle use time zone (T2") by combining the conventional vehicle use time zone (T2) with the new vehicle use time zone (T2'). In this case, the final vehicle use time zone (T2") may include the conventional vehicle use time zone (T2) and the new vehicle use time zone (T2').

If the conventional vehicle use time zone (T2) ranges from 6:15 AM to 7:15 AM as shown in FIG. 7, and if the new vehicle use time zone is denoted by T2', the final vehicle use time zone (T2") may range from 6:15 AM (including 06:15:00) to 7:30 AM (but not including 07:30:00).

Although the vehicle use time zone (T2) includes the overlap time zone (i.e., a time zone ranging from 06:30 AM to 07:15 AM) as shown in FIG. 7, the scope or spirit of the present disclosure is not limited thereto, and the vehicle use time zone (T2) may also include a plurality of isolated time zones as necessary.

The generated final vehicle use time zone (T2") acting as the new vehicle use pattern may be stored in the pattern decision unit 240.

After a lapse of another day, the LF communication unit 220 of the vehicle 200 may transmit the search signal at intervals of a first period during the T2" time zone on the basis of the newly stored vehicle use pattern, and may transmit the search signal at intervals of a second period during the remaining time zones other than the time zone (T2") from among 24 hours.

At any one time point, the RF communication unit 230 may receive the search response signal from the smart key 100. Upon completion of authentication between the vehicle 200 and the smart key 100, the user command reception unit 260 may receive the user command.

The control unit 210 may control constituent elements embedded in the vehicle 200 according to the user command.

In this case, the pattern decision unit 240 may generate the new vehicle use pattern on the basis of the user command reception time decided by the time decision unit 250, and may generate and store the final vehicle use pattern in the same manner as in the above method.

Although the above-mentioned embodiment has disclosed that the vehicle use pattern is updated daily for convenience of description, the pattern decision unit 240 may also update the vehicle use pattern on the basis of another period (i.e., a first period). In this case, the pattern decision unit 240 may also receive the first period from the user through the input device embedded in the vehicle 200 or a separate external input device.

In addition, after a lapse of a predetermined time (i.e., a second period), the pattern decision unit 240 may initialize the stored pattern, and may re-update the vehicle use pattern at intervals of the first period. The second period may be, for example, 7 days, and may be received through the input device embedded in the vehicle 200 or a separate external input device.

Figure 8:
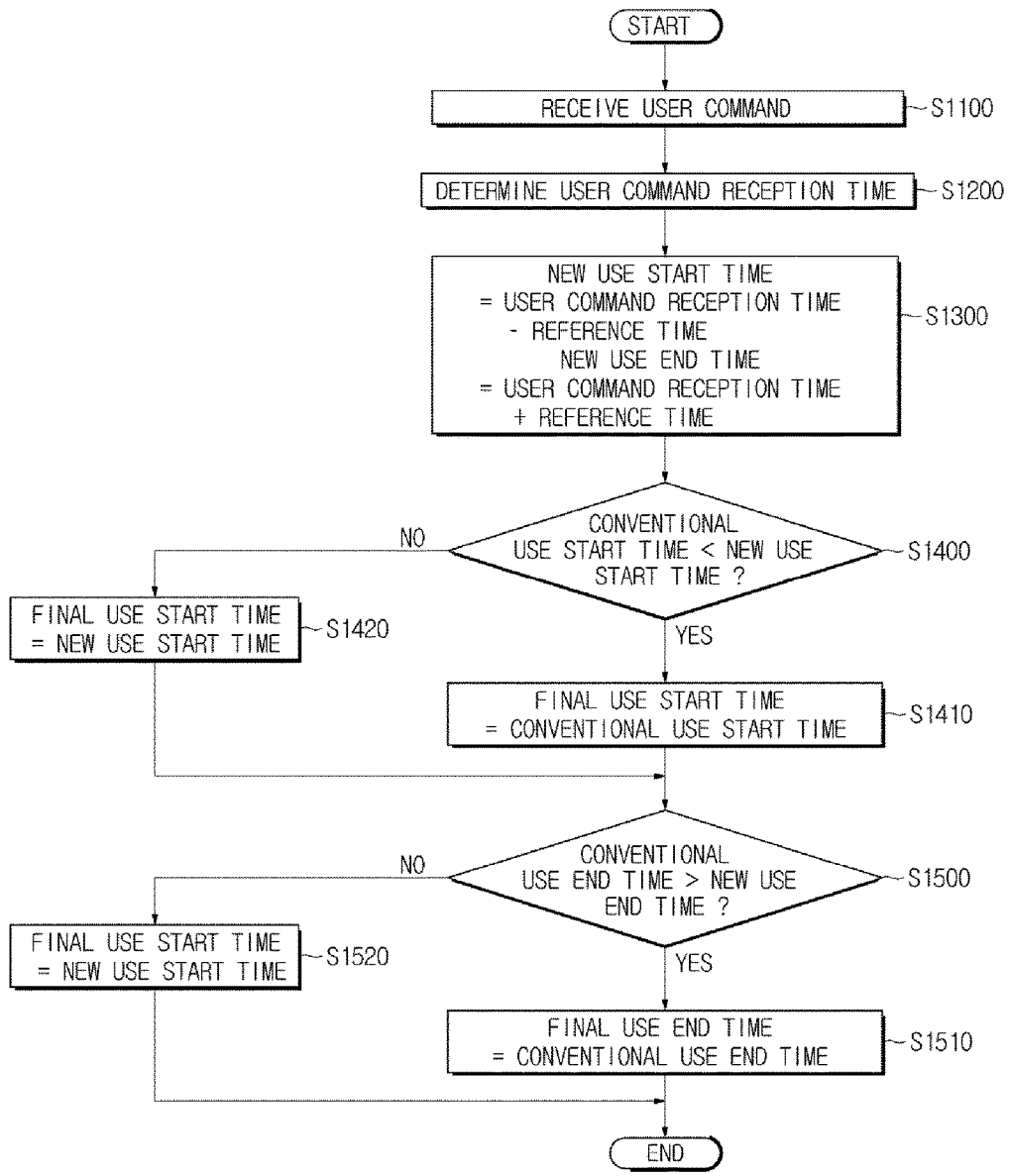
FIG. 8 is a flowchart illustrating a method for controlling the vehicle according to an embodiment of the present disclosure.

A method for controlling the vehicle 200 configured to transmit the search signal according to the vehicle use pattern will hereinafter be described with reference to FIG. 8. FIG. 8 is a flowchart illustrating a method for controlling the vehicle according to an embodiment of the present disclosure. Constituent elements of the vehicle and the smart key shown in FIG. 8 may be identical to those of the vehicle 200 and the smart key 100 shown in FIG. 5, such that the same reference numbers will be used throughout the drawings to refer to the same or like parts.

Referring to FIG. 8, the LF communication unit 220 of the vehicle 200 may transmit the search signal to the LF communication unit 120 of the smart key 100. The RF communication unit 230 of the vehicle 200 may receive the search response signal from the RF communication unit 230 of the smart key 100, and complete the mutual authentication process. Upon completion of the mutual authentication process, the following steps may be carried out.

Referring to FIG. 8, the user command reception unit 260 may receive a command from the user in operation S1100.

The user command may include various user commands for operating the vehicle 200, for example, a pull command of the door-lock knob 17L of the vehicle 200, a rotation command of the steering wheel 207, a pressing command of the start button 31, an open command of the trunk opening unit (not shown), a lock or unlock command of the door lock of the smart key 100, a command for releasing the trunk lock, etc.

Subsequently, the time decision unit 250 according to the embodiment may determine the reception time of the user command in operation S1200. The time decision unit 250 may be embedded in the vehicle 200, and may receive information regarding a current time from the external communication entity, and thus determine a current time on the basis of the received information.

Subsequently, the pattern decision unit 240 may determine a specific time located before a predetermined reference time on the basis of the user command reception time to be the new use start point, and may determine a specific time located after the predetermined reference time on the basis of the user command reception time to be a new use end time in operation S1300.

Thereafter, the pattern decision unit 240 according to the embodiment may compare the use start time (hereinafter referred to as a conventional use start time) contained in the conventional vehicle use pattern with the new use start time in operation S1400, and may compare the use end time (hereinafter referred to as a conventional use end time) contained in the conventional vehicle use pattern with the new use end time in operation S1500.

In more detail, assuming that the conventional use start time is located before the new use start time in operation S1400, the final use start time may remain identical to the conventional use start time in operation S1410.

However, if the conventional use start time is identical to the new use start time or is located after the new use start time in operation S1400, the pattern decision unit 240 may update the final use start time to the new use start time in operation S1420.

In addition, if the conventional use end time point is located after the new use end time in operation S1500, the final use end time may remain identical to the conventional use end time in operation S1510.

However, if the conventional use end time is identical to the new use end time or is located before the new use end time in operation S1500, the pattern decision unit 240 may update the final use end time to the new use end time in operation S1520.

That is, the pattern decision unit 240 may generate the final front-rear time range by combining the front-rear time range contained in the stored vehicle use pattern with the new front-rear time range, and thus update the vehicle use pattern.

The vehicle use pattern may be updated at intervals of a first period, and/or may be initialized at intervals of a second period.

As is apparent from the above description, the vehicle according to the embodiments of the present disclosure can autonomously determine a vehicle use pattern of a user even when the user does not directly input a desired time zone, such that the vehicle can transmit a search signal within a time zone in which the user uses the vehicle.

In addition, the vehicle according to the embodiments of the present disclosure transmits the search signal by discriminating between a first time zone in which the user uses the vehicle and a second time in which the user does not use the vehicle, and a method for controlling the vehicle, resulting in a reduction of unnecessary power consumption generated from the second time.

The above-mentioned embodiments are merely exemplary for better understanding of the present disclosure, and the scope of the present disclosure is not limited thereto. For example, a single component may be divided into two or more components, or two or more components may be combined into a single component as needed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a user command reception unit for receiving a user command;
   a pattern decision unit for determining a vehicle use pattern on the basis of time intervals between reception times of the user commands; and
   a low frequency (LF) transmission unit for transmitting a search signal of a smart key on the basis of the vehicle use pattern,
   wherein the pattern decision unit compares a start time of a new vehicle use time zone with a start time of a conventional vehicle use time zone, compares an end time of the new vehicle use time zone with an end time of the conventional vehicle use time zone and updates the vehicle use pattern according to the result of the comparison.

2. The vehicle according to claim 1, wherein the pattern decision unit is configured to generate a front-rear time range of the user command reception time as a vehicle use time zone.

3. The vehicle according to claim 2, wherein the vehicle use pattern includes a plurality of vehicle use time zones.

4. A vehicle comprising:
   a user command reception unit for receiving a user command;
   a pattern decision unit for determining a vehicle use pattern on the basis of a reception time of the user command; and
   a low frequency (LF) transmission unit for transmitting a search signal of a smart key on the basis of the vehicle use pattern,
   wherein the pattern decision unit is configured to generate a front-rear time range of the user command reception time as a vehicle use time zone,
   wherein the LF transmission unit transmits the search signal at intervals of a first cycle during the vehicle use time zone of a first time period, and transmits the search signal at intervals of a second cycle during the remaining time zones other than the vehicle use time zone during the first time period.

5. The vehicle according to claim 4, wherein the first time period includes 24 hours.

6. The vehicle according to claim 4, wherein the first cycle is shorter than the second cycle.

7. The vehicle according to claim 4, wherein:
   the vehicle use time zone is a new vehicle use time zone;
   the pattern decision unit generates a final vehicle use time zone by combining the new vehicle use time zone with a conventional vehicle use time zone; and
   the LF transmission unit transmits the search signal at intervals of the first cycle during the final vehicle use time zone of the first time period and transmits the search signal at intervals of the second cycle during the remaining time zones other than the final vehicle use time zone of the first time period.

8. The vehicle according to claim 4, wherein the pattern decision unit updates the vehicle use pattern at intervals of the first time period.

9. The vehicle according to claim 8, wherein the pattern decision unit initializes the vehicle use pattern at intervals of the second cycle.

10. A vehicle comprising:
a user command reception unit for receiving a user command;
a pattern decision unit for determining a vehicle use pattern on the basis of a reception time of the user command; and
a low frequency (LF) transmission unit for transmitting a search signal of a smart key on the basis of the vehicle use pattern,
wherein the pattern decision unit is configured to generate a front-rear time range of the user command reception time as a vehicle use time zone,
wherein the front-rear time range includes a time zone ranging from a first time point located before a predetermined reference time on the basis of the user command reception time to a second time point located after the predetermined reference time on the basis of the user command reception time.

11. A method for controlling a vehicle comprising:
receiving a user command;
determining a vehicle use pattern on the basis of time intervals between reception times of the user commands; and
transmitting a search signal of a smart key on the basis of the vehicle use pattern,
wherein the step for determining the vehicle use pattern includes:
comparing a start time of a new vehicle use time zone with a start time of a conventional vehicle use time zone, comparing an end time of the new vehicle use time zone with an end time of the conventional vehicle use time zone and updating the vehicle use pattern according to the result of the comparison.

12. The method according to claim 11, wherein the step for determining the vehicle use pattern includes:
generating a front-rear time range of the user command reception time as a vehicle use time zone.

13. The method according to claim 11, further comprising before the step for reception of the user command, authenticating the smart key.

14. The method according to claim 11, wherein the step for transmitting the search signal includes transmitting the search signal through a low frequency (LF) communication network.

15. A method for controlling a vehicle comprising:
receiving a user command;
determining a vehicle use pattern on the basis of a reception time of the user command; and
transmitting a search signal of a smart key on the basis of the vehicle use pattern,
wherein the step for determining the vehicle use pattern includes generating a front-rear time range of the user command reception time as a vehicle use time zone,
wherein the step for transmitting the search signal of the smart key includes:
transmitting the search signal at intervals of a first cycle during the vehicle use time zone of a first time period; and
transmitting the search signal at intervals of a second cycle during the remaining time zones other than the vehicle use time zone during the first time period.

16. The method according to claim 15, wherein the step for determining the vehicle use pattern further includes updating the vehicle use pattern at intervals of the first time period.

17. The method according to claim 15, wherein:
the vehicle use time zone is a new vehicle use time zone;
the step for generating the front-rear time range includes generating a final vehicle use time zone by combining the new vehicle use time zone with a conventional vehicle use time zone; and
the step for transmitting the search signal includes transmitting the search signal at intervals of the first cycle during the final vehicle use time zone of the first time period, and transmitting the search signal at intervals of the second cycle during the remaining time zones other than the final vehicle use time zone of the first time period.

18. The method according to claim 15, wherein the step for determining the vehicle use pattern further includes:
initializing a vehicle use pattern at intervals of a second time period.

19. A method for controlling a vehicle comprising:
receiving a user command;
determining a vehicle use pattern on the basis of a reception time of the user command; and
transmitting a search signal of a smart key on the basis of the vehicle use pattern,
wherein the step for determining the vehicle use pattern includes generating a front-rear time range of the user command reception time as a vehicle use time zone,
wherein the front-rear time range includes a time zone ranging from a first time point located before a predetermined reference time on the basis of the user command reception time to a second time point located after the predetermined reference time on the basis of the user command reception time.

* * * * *